US012587616B2

(12) United States Patent
Fujita

(10) Patent No.: US 12,587,616 B2
(45) Date of Patent: Mar. 24, 2026

(54) IMAGE CAPTURING SYSTEM

(71) Applicant: CANON KABUSHIKI KAISHA,
Tokyo (JP)

(72) Inventor: Tsukasa Fujita, Tokyo (JP)

(73) Assignee: CANON KABUSHIKI KAISHA,
Tokyo (JP)

( * ) Notice: Subject to any disclaimer, the term of this
patent is extended or adjusted under 35
U.S.C. 154(b) by 0 days.

(21) Appl. No.: 18/888,216

(22) Filed: Sep. 18, 2024

(65) Prior Publication Data

US 2025/0106361 A1 Mar. 27, 2025

(30) Foreign Application Priority Data

Sep. 27, 2023 (JP) ................................. 2023-164709

(51) Int. Cl.
  *H04N 7/18* (2006.01)
  *B60R 1/26* (2022.01)
  *G06V 20/58* (2022.01)
  *B60Q 9/00* (2006.01)

(52) U.S. Cl.
  CPC ............... *H04N 7/183* (2013.01); *B60R 1/26*
  (2022.01); *G06V 20/58* (2022.01); *B60Q 9/00*
  (2013.01); *B60R 2300/307* (2013.01); *B60R*
  *2300/802* (2013.01)

(58) Field of Classification Search
  CPC .... H04N 7/183; B60R 1/26; B60R 2300/307;
  B60R 2300/802; B60R 1/28; G06V
  20/58; B60Q 9/00
  See application file for complete search history.

(56) References Cited

U.S. PATENT DOCUMENTS

2022/0227296 A1* 7/2022 Sperrle ................ G06T 3/4038

FOREIGN PATENT DOCUMENTS

JP        2011-105124 A      6/2011

* cited by examiner

*Primary Examiner* — James M Pontius
(74) *Attorney, Agent, or Firm* — Carter, DeLuca & Farrell
LLP

(57) ABSTRACT

An image capturing system enabling rear monitoring of
vehicle and cargo bed monitoring by one image capturing
apparatus comprising: an image capturing apparatus dis-
posed in a vehicle provided with a cargo area; and a display
image generation unit configured to output image data
generated by the image capturing apparatus to an image
display unit, wherein the image capturing apparatus is
disposed in such a manner that a first region in the rear of the
vehicle and a second region including the cargo area can be
imaged simultaneously.

5 Claims, 12 Drawing Sheets

Figure 3:
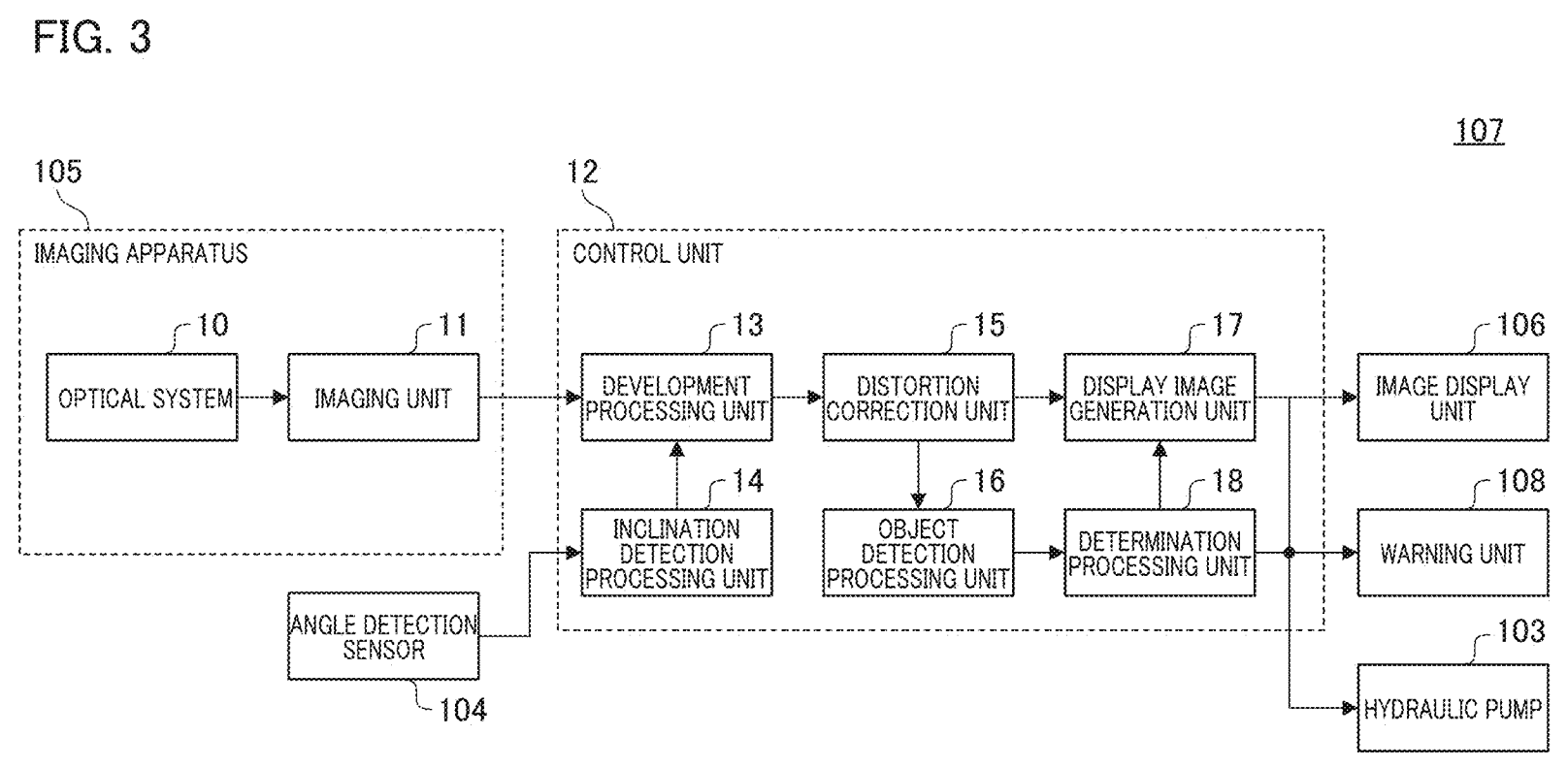

IMAGING APPARATUS 105

OPTICAL SYSTEM 10

IMAGING UNIT 11

CONTROL UNIT 12

DEVELOPMENT PROCESSING UNIT 13

INCLINATION DETECTION PROCESSING UNIT 14

DISTORTION CORRECTION UNIT 15

OBJECT DETECTION PROCESSING UNIT 16

DISPLAY IMAGE GENERATION UNIT 17

DETERMINATION PROCESSING UNIT 18

IMAGE DISPLAY UNIT 106

WARNING UNIT 108

HYDRAULIC PUMP 103

ANGLE DETECTION SENSOR 104

IMAGE CAPTURING SYSTEM

BACKGROUND OF THE INVENTION

Field of the Invention

The present invention relates to an image capturing system, a vehicle, and the like.

Description of the Related Art

In a transport vehicle (hereinafter, explained as a dump truck) that transports earth and sand and the like used for civil engineering work that is loaded on the movable cargo bed, there is a drawback in which many blind spots are present when an operator seated on a driver's seat in a driver's cab views the rear side. For example, in a rearview mirror, it is difficult to view directly behind the vehicle due to earth and sand and the like loaded on the cargo bed.

In particular, in a case where earth removal is performed, an operator has to confirm the area behind the vehicle through a small gap between the cargo bed and the vehicle body. Therefore, in Japanese Patent Application Laid-Open No. 2011-105124, a transport vehicle is provided with two monitoring camera devices, that is, an in-cargo bed monitoring camera and a backward direction monitoring camera, and has a configuration of projecting images captured by these monitoring cameras on a monitor.

However, in the configuration of in Japanese Patent Application Laid-Open No. 2011-105124, there is a drawback in which the camera installed in the lower traveling body cannot monitor the cargo bed, and the camera installed in the upper portion of the cargo bed cannot monitor the rear side when the cargo bed is moved. Therefore, it is difficult to achieve both monitoring for the backward direction and monitoring for the cargo bed by one camera.

SUMMARY OF THE INVENTION

An image capturing system of one aspect of the present invention comprises: an image capturing apparatus disposed in a vehicle provided with a cargo area; a display image generation unit configured to output image data generated by the image capturing apparatus to an image display unit, wherein the image capturing apparatus is disposed in such a manner that a first region in the rear of the vehicle and a second region including the cargo area can be imaged simultaneously.

Further features of the present invention will become apparent from the following description of embodiments with reference to the attached drawings.

BRIEF DESCRIPTION OF THE DRAWINGS

FIG. 3 is a functional block diagram showing a configuration example of an image capturing system 107 including an image capturing apparatus 105 and a control unit 12 of the present embodiment.

FIG. 5 is a diagram that explains an example of a movable region of a cargo bed and an imaging range of a camera in the first embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
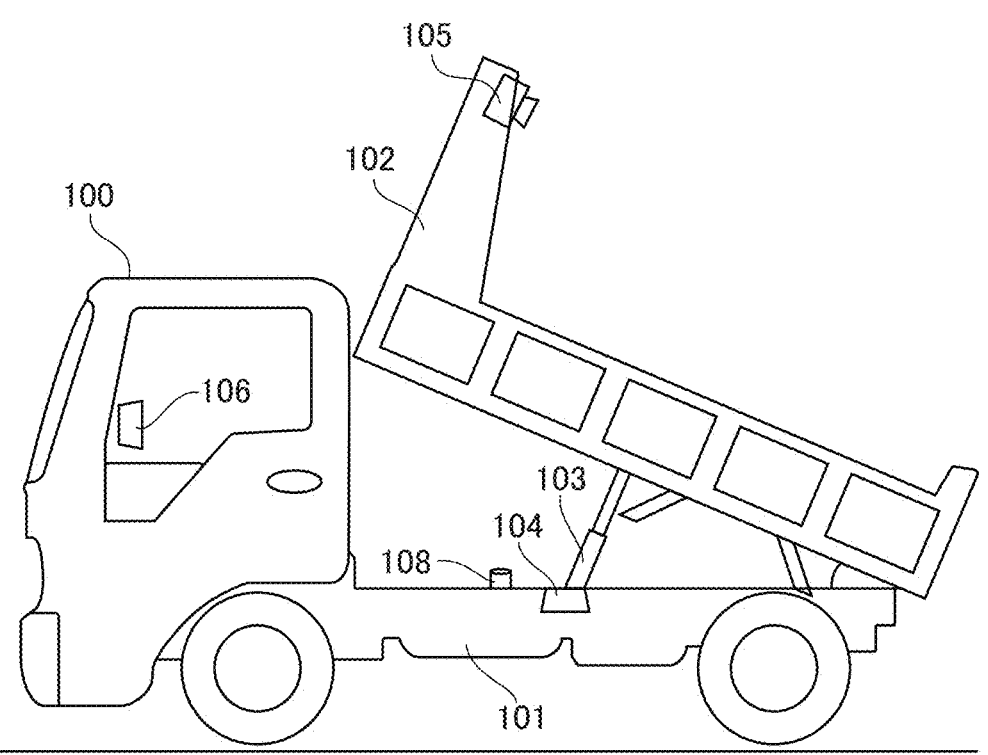
FIG. 1 is an external view schematically showing the external appearance of a dump truck that is an example of a transport vehicle according to the first embodiment of the present invention.

FIG. 1 is an external view schematically showing the external appearance of a dump truck that is an example of a transport vehicle according to the first embodiment. Note that, although in the present embodiment, the dump truck is explained as an example, the transport vehicle may be any vehicle including a cargo bed, and may be various other transport vehicles including a movable cargo bed, such as a crawler carrier, a container handling vehicle, and an articulated dump truck.

In FIG. 1, a transport vehicle 100 in the first embodiment is configured by a traveling body 101 having wheels and a cargo bed 102. The cargo bed 102 can be inclined in the upper and lower direction, that is, raised and lowered, with the lower portion of the rear end of the cargo bed 102 serving as a fulcrum, by a hydraulic pump 103 provided in the traveling body 101. The cargo bed 102 has a width approximately equal to that of the traveling body 101 in the width direction.

The cargo bed 102 consists of a loading table, a front wall surrounding the perimeter of the loading table, left and right side walls, and a rear door. These walls and the rear door form a substantially rectangular recess together with the loading table, and earth and sand, and the like are loaded in this recess.

Additionally, in the present embodiment, the image capturing apparatus 105 is installed on the upper portion of the front wall of the cargo bed 102, and the image capturing apparatus 105 is disposed in such a manner that an image in the rear of the transport vehicle 100 can be captured. Accordingly, the image capturing apparatus 105 can capture an image of a loaded object, for example, earth and sand loaded on the cargo bed 102, and can capture an image of a rear vehicle and the like. Additionally, the captured image can be displayed by an image display unit 106. Note that the image capturing apparatus 105 has an optical system 10 and an imaging unit 11.

In addition, when the cargo bed 102 is raised and inclined and the rear door is opened by its own weight, earth and sand, and the like loaded on the cargo bed 102 slide down from the cargo bed 102 and are discharged to the ground. The hydraulic pump 103 of the traveling body 101 raises or lowers the cargo bed 102 to change the raised or lowered state of the cargo bed 102.

Additionally, an angle detection sensor 104 that detects the raising and lowering state of the cargo bed 102 is installed, and this angle detection sensor 104 detects a change in an inclination angle 20a between the traveling body 101 and the cargo bed 102 by measuring, for example, the extended length of the hydraulic pump 103. Reference numeral 108 denotes a warning unit that includes a warning light, for example, a rotating light and a Patlite (registered trademark), and turns on a red warning light in a case where the approach of an object (a person, an entity, and the like) has been detected.

Figures 2A, 2B:
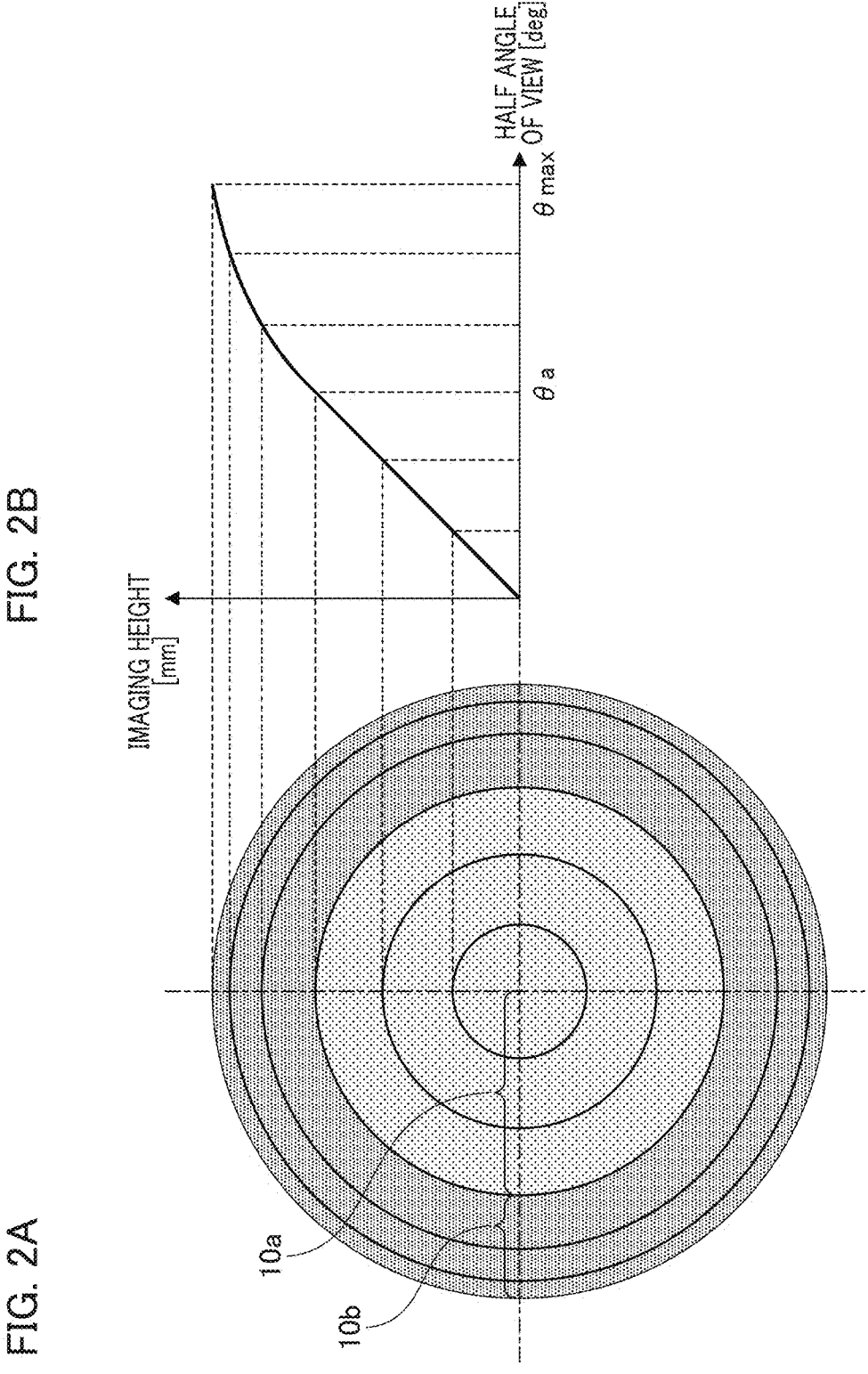
FIGS. 2A and 2B are diagrams for explaining optical characteristics of an optical system according to the present embodiment.

Next, optical characteristics of the optical system 10 of the image capturing apparatus 105 will be explained in detail. FIGS. 2A and 2B are diagrams for explaining optical characteristics of the optical system according to the present embodiment. FIG. 2A is a diagram showing the image height y at each angle of view on the light receiving surface of the imaging element included in the imaging unit 11 in the form of contour lines.

FIG. 2B is a diagram illustrating projection characteristics representing the relation between an image height y, which indicates a height of an image formed by the optical system 10 of the image capturing apparatus 105, and a half angle of view θ. In FIG. 2B, the horizontal axis represents the half angle of view θ (the angle formed by the optical axis and the incident light ray), and the vertical axis represents the image height y on the light receiving surface (on the image plane) of the imaging element.

As shown in FIG. 2B, the optical system 10 of the image capturing apparatus 105 is configured so that the projection characteristic y(θ) is different in a region of less than a predetermined half angle of view θa and a region of the half angle of view θa or more. Therefore, the optical system 10 is configured so that, when an amount of increase in the image height y with respect to the half angle of view θ per unit is defined as a resolution, the resolution varies depending on the region on the light receiving surface of the imaging element.

This local resolution can be represented by a differential value dy (θ)/dθ of the projection characteristic y (θ) at the half angle of view θ. For example, it can be said that as the gradient of the projection characteristic y(θ) in FIG. 2B becomes larger, the resolution is higher. Additionally, it can be said that as the interval of the image height y in each angle of view in the form of contour lines in FIG. 2A becomes larger, the resolution is higher.

The optical system of the present embodiment has a projection characteristic in which the increase rate of the image height y (the gradient of the projection characteristic y (θ) in FIG. 2B) is large in the central region in the vicinity of the optical axis, and the increase rate of the image height y decreases as the angle of view increases in the peripheral region outside the central region.

In the first embodiment, a region closer to the center generated on the light receiving surface of the imaging element when the half angle of view θ is less than a predetermined half angle of view θa is referred to as a high-resolution region 10a, and an outward region in which the half angle of view θ is equal to or greater than a predetermined half angle of view θa is referred to as a low-resolution region 10b. That is, the optical system forms an optical image of a first resolution in a central region including the center of the light receiving surface of the imaging element, and forms an optical image of a second resolution lower than the first resolution in a peripheral region that is the peripheral area of the central region.

Additionally, in the first embodiment, the high-resolution region 10a is a low-distortion region having a relatively small distortion, and the low-resolution region 10b is a high-distortion region having a relatively large distortion. Accordingly, in the first embodiment, a high-resolution region may be referred to as a low-distortion region and a low-resolution region may be referred to as a high-distortion region.

Note that the characteristic as shown in FIG. 2A is an example, and the present invention is not limited thereto. For example, the low-resolution region and the high-resolution region of the optical system may not be concentrically configured, and the respective regions may have distorted shapes.

Additionally, the center of gravity of the low-resolution region and the center of gravity of the high-resolution region may not coincide with each other. Additionally, the center of gravity of the low-resolution region and the center of gravity of the high-resolution region may be shifted from the center of the light receiving surface of the imaging element. In the optical system of the present embodiment, it suffices if the high-resolution region is formed in the vicinity of the optical axis, and the low-resolution region is formed on the peripheral side from the optical axis, that is, outside the high-resolution region.

The optical system 10 is configured so that the projection characteristic y (θ) is greater than f×θ in the high-resolution region (low-distortion region) 10a (f is the focal distance of the optical system 10). Additionally, the projection characteristic y (θ) in the high-resolution region (low distortion region) is set to be different from the projection characteristic in the low resolution region (high distortion region).

In a case where θ max is the maximum half angle of view of the optical system 10, the ratio θa/θ max of θa to θ max is desirably equal to or greater than a predetermined lower limit value, and for example, 0.15 to 0.16 is desirable as the predetermined lower limit value. Additionally, the ratio θa/θ max of θa to θ max is desirably equal to or less than a predetermined upper limit value, and, for example, 0.25 to 0.35 is desirable.

For example, in a case where θa is set to 90°, the predetermined lower limit value is set to 0.15, and the predetermined upper limit value is set to 0.35, θa is desirably determined in a range of 13.5 to 31.5°. However, the above description is an example, and the present invention is not limited thereto.

Furthermore, the optical system 10 is configured so that the projection characteristic y (θ) also satisfies the following Formula 1.

$$1 < \frac{f \times \sin\theta_{max}}{y(\theta_{max})} \leq A \qquad \text{(Formula 1)}$$

Here, f is the focal length of the optical system 10 as described above, and A is a predetermined constant. In Formula 1, when the lower limit value is set to 1, the center resolution can be set higher than that of a fisheye lens of the orthogonal projection method (y=f×sin θ) having the same maximum image formation height. Additionally, it is possible to maintain favorable optical performance while obtaining an angle of view equivalent to that of a fisheye lens by setting the upper limit value to A in Formula 1.

The predetermined constant A may be determined in consideration of the balance between the resolutions of the high-resolution region and the low-resolution region, and is preferably set to 1.4 to 1.9. However, the above description is an example, and the present invention is not limited thereto.

By configuring the optical system 10 as described above, high resolution can be obtained in the high-resolution region 10a, while the amount of increase in the image height y with respect to the half angle of view θ per unit area is reduced in the low-resolution region 10b, and a wider angle of view can be captured. Therefore, while the wide angle of view equivalent to that of the fisheye lens is set as the imaging range, high resolution can be obtained in the high-resolution region 10a.

In the first embodiment, in the high-resolution region (low-distortion region), projection characteristics approximate to the central projection method (y=f× tan θ) or the equidistant projection method (y=f×θ), which are projection characteristics of the optical system for normal imaging, are used. Therefore, in the high-resolution region (low-distortion region), the optical distortion is small, and a fine image can be displayed.

Note that since the same effect can be obtained if the projection characteristic y(θ) satisfies the condition of Formula 1 as described above, the first embodiment is not limited to the projection characteristic as shown in FIG. 2.

A merit of obtaining the high-resolution region 10a with less distortion is that display with a lower delay is possible. In a case where a large distortion is present in the displayed image, it is difficult to grasp the positional relation of the object reflected in the display, and thus, it is necessary to perform distortion correction processing on the captured image.

Although in a case where distortion correction is performed, a method of processing the distortion correction in a hardware manner using an FPGA and the like or a method of processing the distortion correction in a software manner using a CPU and the like is conceivable, in either case, a delay is caused.

In contrast, in the present embodiment, since the imaging region displayed on the image display unit 106 can be prevented from being distorted due to the optical characteristics of the optical system 10, distortion correction is not necessary, and display with a lower delay is possible.

FIG. 3 is a functional block diagram illustrating a configuration example of an image capturing system 107 including the image capturing apparatus 105 and the control unit 12 according to the present embodiment. Note that a part of the functional blocks as shown in FIG. 3 is realized by causing the CPU and the like, serving as a computer (not illustrated) included in the image capturing system 107, to execute a computer program stored in a memory serving as a storage medium (not illustrated).

However, a part or all of them may be realized by hardware. As hardware, a dedicated circuit (ASIC) and a processor (reconfigurable processor, DSP) can be used.

Additionally, each of functional blocks as shown in FIG. 3 may not be incorporated in the same housing, and may be configured by separate devices connected to each other via a signal path. For example, at least a part of the control unit 12, a part or all of the image display unit 106, the warning unit 108, and the like may be provided in, for example, an external terminal and the like different from a movable apparatus.

The image capturing system 107 as shown in FIG. 3 is a system for displaying an image captured by the image capturing apparatus 105 installed on the upper portion (front guard frame) of the cargo bed 102 of a transport vehicle 100 on the image display unit 106. In addition, the image capturing system 107 also has the image capturing apparatus 105, the control unit 12, the image display unit 106, the warning unit 108, the hydraulic pump 103, the angle detection sensor 104, and the like.

As described above, the image capturing apparatus 105 is installed on the cargo bed of the vehicle in order to monitor the cargo bed and the backward direction of the vehicle. Additionally, as described above, the image capturing apparatus 105 has the optical system 10 and the imaging unit 11. The imaging unit 11 has an imaging element, and the optical system 10 has at least one lens and guides light incident from the outside to a light receiving surface of the imaging element of the imaging unit 11 to form an optical image. The details of the optical characteristics of the optical system 10 are as described above.

That is, the optical system forms a high-resolution optical image, which corresponds to the high-resolution region 10a in FIG. 2, in the angle-of-field region around the optical axis, and forms a low-resolution optical image, which corresponds to the low-resolution region 10b in FIG. 2, in the angle-of-field region peripheral to the optical axis.

The imaging unit 11 includes an imaging element (image sensor) for converting an optical object image formed by the optical system 10 into an electric signal. The imaging element is, for example, a complementary metal oxide semiconductor (CMOS) image sensor and a charge coupled device (CCD) image sensor.

The electric signal converted by the imaging element is converted into a predetermined image signal inside the imaging unit 11, and is output to the control unit 12 in the subsequent stage.

The control unit 12 has, for example, a system on chip (SOC)/field programmable gate array (FPGA), a CPU serving as a computer, and a memory serving as a storage medium. The CPU performs various kinds of control of the entire image capturing system by executing a computer program stored in the memory.

The control unit 12 has various interfaces for inputting and outputting images, and outputs images to the image display unit 106. Note that some or all of the functions of the control unit 12 may be performed in the image capturing apparatus 105.

The control unit 12 is connected to the image capturing apparatus 105, the image display unit 106, the angle detection sensor 104, and the warning unit 108, and controls the image display unit 106, the warning unit 108, and the hydraulic pump 103 according to a processing result inside the control unit 12.

The image display unit 106 is for displaying an image of at least one of the side and rear of the vehicle and the top of the cargo bed, and displays an image from the control unit 12. Note that, although the image display unit 106 is provided at the driver's seat of the transport vehicle 100 as shown in FIG. 1, for example, a monitor of a mobile terminal outside the transport vehicle 100 may be used, and in that case, an image signal from the control unit 12 is displayed by using a communication method such as wireless.

The control unit 12 acquires an image signal from the image capturing apparatus 105 and acquires the inclination angle of the cargo bed 102 from the angle detection sensor 104. A development processing unit 13 develops the image signal transmitted from the imaging unit 11 into a video, and performs processing such as wide dynamic range (WDR) correction, gamma correction, LookUp table (LUT) processing, and video signal clipping. Additionally, the development processing unit 13 performs various kinds of image processing such as distortion correction and object detection.

A distortion correction unit 15 corrects distortion of all or part of the input image by executing distortion correction processing by a known technique. Note that the distortion correction unit 15 performs coordinate conversion for displaying the image that has been input from the imaging unit on the rectangular screen of the display unit. Note that if the distortion of the image input from the imaging unit 11 is small, the signal may be directly transmitted to a display image generation unit 17 without correcting the distortion.

The image signal processed by the distortion correction unit 15 is input to the object detection processing unit 16 and the display image generation unit 17. The distortion correction performed by the distortion correction unit 15 makes it easy to visually recognize the image when the image is displayed on the image display unit 106, and also improves a detection rate of object detection processing performed inside the object detection processing unit 16, which will be described below.

In the object detection processing unit 16, object detection processing is performed by using the image signal that has been output from the distortion correction unit 15, and whether or not an obstacle and the like such as a vehicle and a person are present in the image is determined. Deep learning is used for object detection. For example, as deep learning, it is preferable that You Only Look Once (YOLO) that is easy to learn and detection if fast is used.

Additionally, as other deep learning, a single shot multi box detector (SSD), a FastR-CNN (regional convolution neural network), a FastR-CNN, an R-CNN, and the like may be used.

The object detection result includes information on four-point coordinates, which are four vertex coordinates of a rectangle (a bounding box) indicating the position where the object has been detected, and object name information indicating the classification of the detected object. Note that the object detection processing performed by the object detection processing unit 16 may detect foreign objects by applying different learning results depending on the angle of view of the input image.

That is, the learning result of obstacles such as a vehicle and a person may be applied to the upper portion of the angle of view, and the learning result of foreign objects such as a loaded object may be applied to the lower portion of the angle of view.

Thus, for example, the detection processing of a loaded object 603 on the cargo bed 102 is executed, and the detection processing for the falling of the load object and earth removal is executed. It is possible to realize accurate and high-speed detection processing by limiting the detection target according to the angle of view in this way.

The display image generation unit 17 generates an image to be displayed on the image display unit 106. The display image generation unit 17 generates a display image by performing image cutout processing according to, for example, the display resolution of the image display unit 106 based on the image signal received from the distortion correction unit 15. That is, the display image generation unit 17 outputs the image data generated by the image capturing apparatus to the image display unit 106.

Alternatively, a plurality of regions may be cut out from the image signal that has been received from the distortion correction unit 15 and combined to generate one display image. For example, an image of the rear of the transport vehicle 100 and an image in the direction of the ground on which earth removal and the like are performed from the cargo bed 102 may be cut out and combined to generate one display image.

Additionally, the display image generation unit 17 receives the object detection result from the object detection processing unit 16 via a determination processing unit 18, and superimposes the result on the above-described display image to combine a warning image. That is, a rectangle (bounding box) indicating the position at which the object is detected is combined with the display image.

The determination processing unit 18 receives the object detection result from the object detection processing unit 16, and determines whether or not to stop the raising and lowering (inclination operation) of the cargo bed 102. For example, the state of removal of earth and sand from the cargo bed 102 may be detected, and the raising and lowering (inclination operation) of the cargo bed 102 may be stopped when the completion of the earth removal has been determined. Alternatively, the raising and lowering (inclination operation) of the cargo bed 102 may be stopped when it has been determined that the detected earth removal status has approached a predetermined level.

Additionally, whether or not to stop may be determined according to the classification of the detected object. For example, in a case where an obstacle, for example, a vehicle and a person, are detected, it may be determined to stop the vehicle for safety. In a case where the determination processing unit 18 determines to stop the operation, the determination processing unit 18 immediately transmits a stop signal to the hydraulic pump 103, and the hydraulic pump 103 stops rising and lowering.

Additionally, the determination processing unit 18 also plays a role of transmitting a warning issue signal to the warning unit 108. This allows the warning unit 108 to be controlled to issue a warning in a case where the object detection processing unit 16 detects an object.

The warning unit 108 includes a warning light, for example, a rotating light and a Patlite (registered trademark). Note that the warning light may be composed of LEDs, and the color of the emanating light can be controlled depending on the type of warning. Additionally, the warning unit 108 may include a warning buzzer and the like that provide notification by a warning sound, and may control a sound to be emitted depending on the type of warning.

For example, in a case where the object detection processing unit 16 detects a person or an obstacle in the high-resolution region 10a, the warning unit 108 may turn on a red warning light, and in a case where the object detection processing unit 16 detects a person or an obstacle in the low-resolution region 10b, the warning unit 108 may turn on a yellow warning light. Additionally, in a case where the warning unit 108 is a warning buzzer, the buzzer sound may be changed according to the classification of the detected resolution region.

Figure 4:
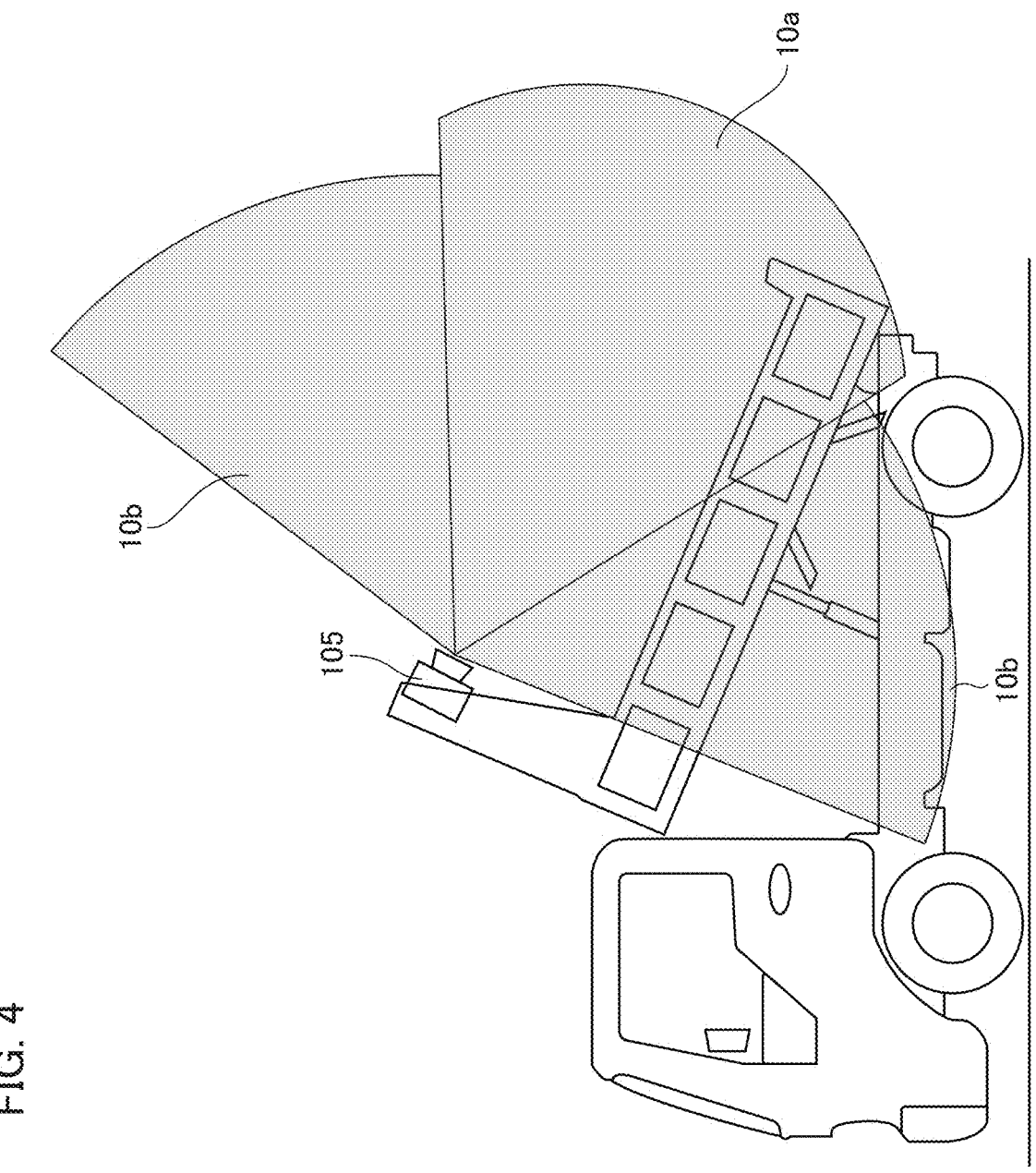
FIG. 4 is a diagram that explains an example of a dump truck that is an example of a transport vehicle and an imaging range of the image capturing apparatus 105 in the first embodiment.

Next, FIG. 4 is a diagram that explains an example of a dump truck that is an example of a transport vehicle and an imaging range of the image capturing apparatus 105 in the first embodiment. Note that an example in which the image capturing apparatus 105 is installed on the upper portion of the cargo bed of the vehicle will be explained.

As shown in FIG. 4, in the present embodiment, the image capturing apparatus 105 is installed on the upper portion of the cargo bed of the vehicle so as to be directed in the backward direction of the transport vehicle 100, and thus, it is possible to capture an image of a region necessary for monitoring the backward direction. Note that, in FIG. 4, reference numeral 10*a* corresponds to the high-resolution region 10*a* in FIG. 2 and may be referred to as a first region. Additionally, reference numeral 10*b* corresponds to the low-resolution region 10*b* in FIG. 2, and may be referred to as a second region.

Additionally, as shown in FIG. 4, the image capturing apparatus 105 is disposed in a manner such that a first region that is the rear of the vehicle and a second region including the cargo area that includes the cargo bed can be simultaneously imaged. Additionally, the image capturing apparatus 105 is disposed on the cargo bed 102 so that an image of a blind spot region in the rear of the vehicle that cannot be visually recognized from the driver's seat of the transport vehicle 100 in the first region.

Additionally, the optical system 10 forms an optical image of the first region in a central region of a light receiving surface of the imaging element, and forms an optical image of the second region in a peripheral region of the light receiving surface of the imaging element. Accordingly, the image capturing apparatus 105 can generate image data by imaging the first region at a higher resolution than the second region.

Figure 5:
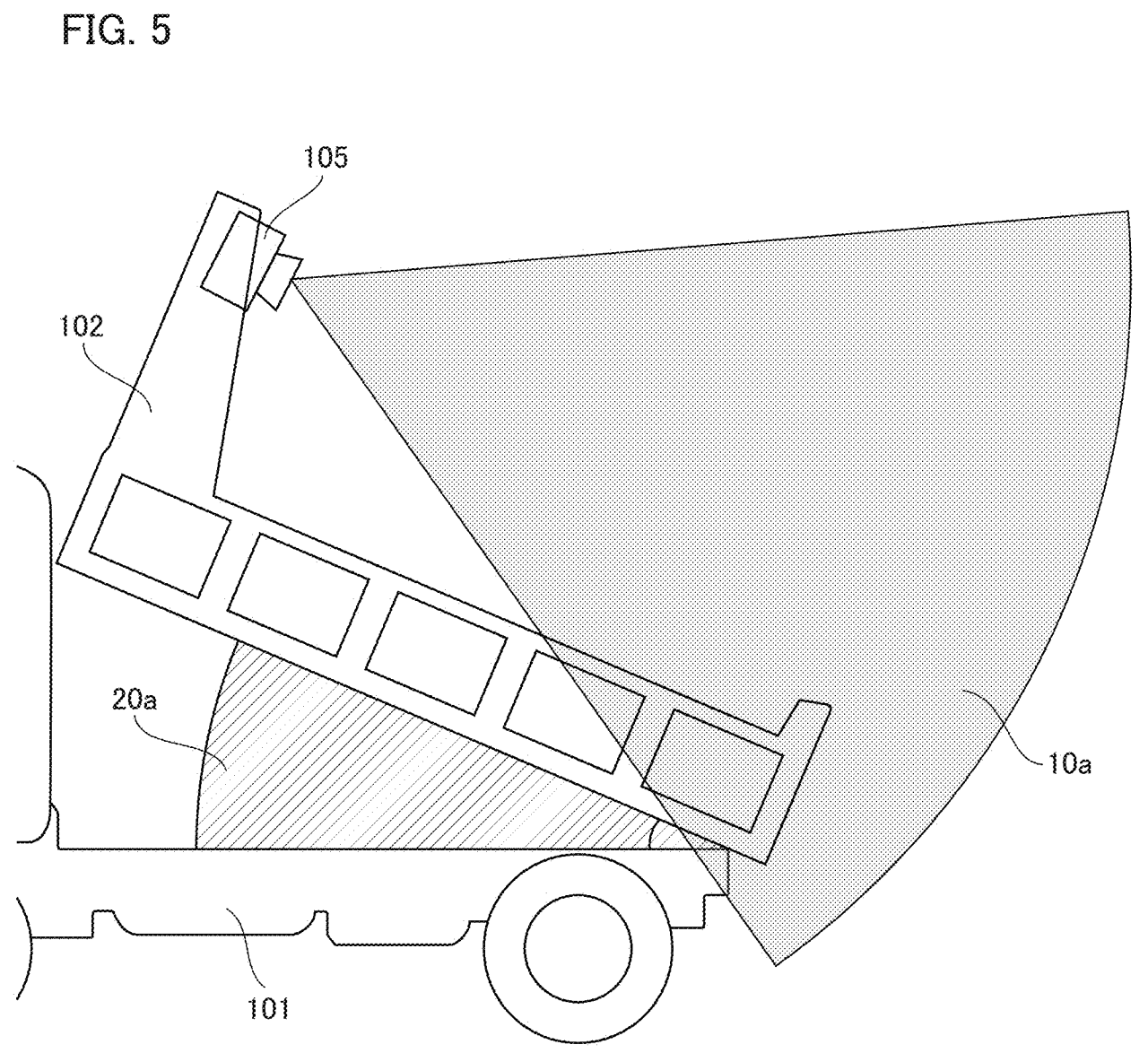

FIG. 5 is a diagram that explains an example of the movable region of the cargo bed and the imaging range of the camera in the first embodiment. As shown in FIG. 5, the image capturing apparatus 105 is disposed in a manner such that the inclination angle 20*a* detected based on the extension amount of the hydraulic pump 103 is included in the high-resolution region 10*a*.

That is, the image capturing apparatus 105 is disposed in such a manner that the rear of the vehicle is included in the high-resolution region 10*a* (the first region) even if the cargo bed 102 is raised or tilted, causing the optical axis direction of the image capturing apparatus to change.

Specifically, in a case where the inclination angle 20*a* is, for example, 50° as the maximum inclination angle, and the high-resolution region 10*a* is ±60° from the optical axis, it is preferable that the image capturing apparatus 105 is disposed in a manner such that the horizontal direction of the transport vehicle 100 is always included in the high-resolution region 10*a* is desirable. That is, the optical axis of the camera is desirably about ±60°.

In the present embodiment, the image capturing apparatus 105 is installed in a manner such that the angle-of-view region of the high resolution region 10*a* as explained in FIG. 4 images the rear region of the transport vehicle 100. Additionally, since the image capturing apparatus 105 is installed in a manner such that the region of the lower part of the angle of view of the low-resolution region 10*b* images the inside of the cargo bed 102, it is possible to acquire an image for monitoring the backward direction of the vehicle and an image for monitoring the cargo bed with one image capturing apparatus 105.

Therefore, it is possible to obtain a high-resolution, low-distortion image of the rear of the vehicle by the image display unit 106. Note that, the installation direction (optical axis direction) of the image capturing apparatus 105 may be appropriately adjusted in order to adjust the field of view of the image displayed on the image display unit 106.

Note that, in the image capturing system 107 of the present embodiment, the predetermined cutout processing is performed from the image in the high-resolution region 10*a* as explained in FIG. 2 according to the inclination angle 20*a* of the bed 102, and the cutout image is output to the image display unit 106.

That is, the display image generation unit 17 generates a display image by cutting out a partial image region of the image captured by the image capturing apparatus 105, and changes the image range to be cut out according to the inclination angle of the cargo bed 102.

Figure 6:
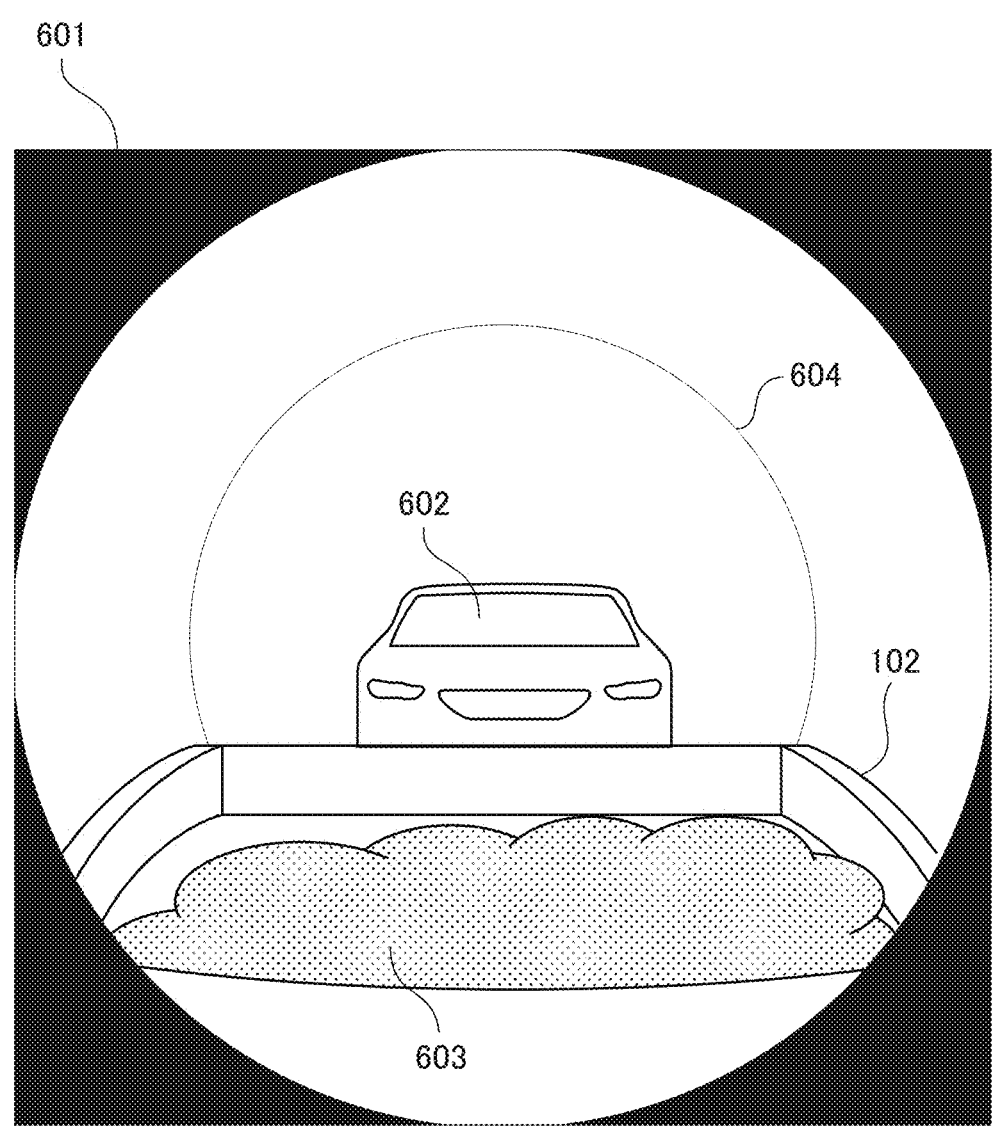
FIG. 6 is a diagram showing an example of an image captured by the image capturing apparatus 105 of the first embodiment.

FIG. 6 is a diagram showing an example of an image captured by the image capturing apparatus 105 of the first embodiment. An image 601 as shown in FIG. 6 is an image before the cut-out processing in a state where the cargo bed 102 is most lowered, that is, in a state where the inclination angle 20*a* is 0°, and, in the image 601, a vehicle 602 behind the transport vehicle 100 and the loaded object 603 of the cargo bed 102 are displayed.

Thus, the image capturing apparatus 105 of the present embodiment can include the rear of the transport vehicle 100 and the cargo bed 102 in one angle of view as in the image 601. Note that, in FIG. 6, reference numeral 604 denotes a virtual boundary line between the angle-of-view region of the high-resolution region 10*a* and the angle-of-view region of the low-resolution region 10*b*.

Although the virtual boundary line 604 is not displayed on the screen of the image display unit 106, the boundary line may be selectively displayed. Note that the inside of the boundary line 604 is the angle-of-view region of the high-resolution region 10*a*, and the outside of the border line 604 is the angle-of-view region of the low-resolution region 10*b*.

Figure 7:
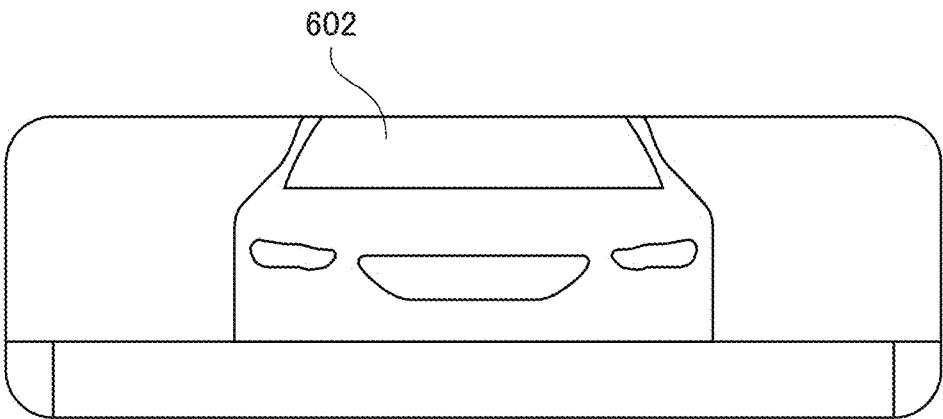
FIG. 7 is a diagram showing an example of a cutout image displayed by an image display unit 106 of the first embodiment.

FIG. 7 is a view showing an example of a cut-out image displayed by the image display unit 106 of the first embodiment. The cut-out image as shown in FIG. 7 is a rectangular image in the horizontal direction behind the transport vehicle 100 cut out from the image 601 and is a rectangular image behind the vehicle output to the image display unit 106 for the rear-view mirror when viewed from the driver. In the example of FIG. 7, the vehicle 602 that is a following vehicle of the transport vehicle 100 is displayed.

Although the vehicle 602 is distant from the transport vehicle 100, the vehicle 602 is present in the high-resolution region 10*a* of the image capturing apparatus 105, and therefore, the vehicle 602 can be clearly imaged at high resolution. Although, in the present embodiment, the loaded object 603 that is present on the cargo bed 102 is present in the lower part of the angle of view of the low-resolution region 10*b* of the image capturing apparatus 105, the distance is close, and thus, the loaded object 603 is also clearly imaged.

Thus, in the present embodiment, the image capturing apparatus 105 is disposed on the upper portion of the front wall of the cargo bed 102 of the transport vehicle 100 and is disposed toward the rear of the transport vehicle 100, so that both the monitoring for the backward direction and the monitoring for the cargo bed can be achieved by one device.

Figure 8:
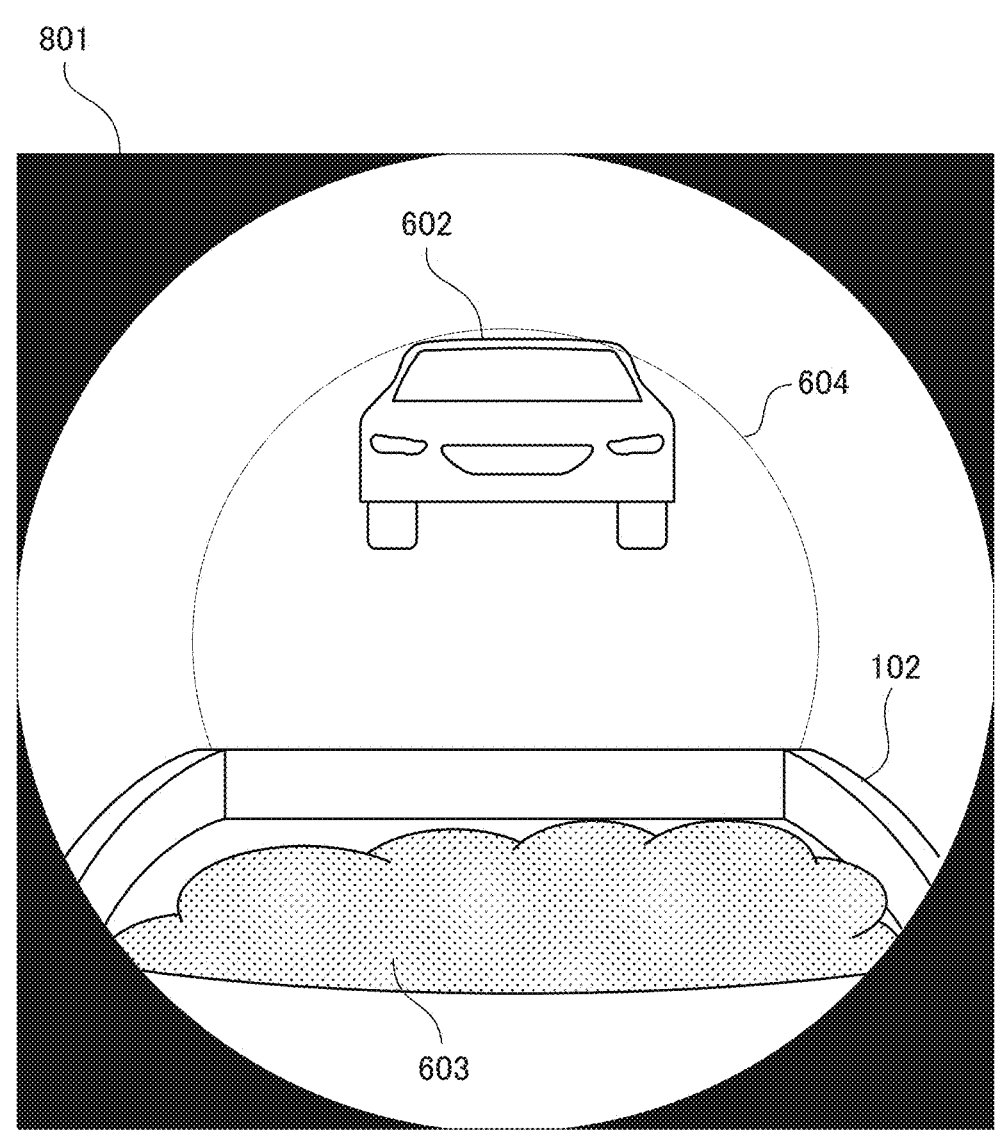
FIG. 8 is a diagram showing an example of an image captured when a cargo bed 102 is in a raised state in the first embodiment.

FIG. 8 is a diagram showing an example of an image captured in a state where
the cargo bed 102 is in the raised state in the first embodiment. An image 801 is an image of the cargo bed 102 in the raised state (inclined state), and is an image before the cut-out processing in a case where the inclination angle 20*a* is, for example, 50°.

As explained in FIG. 5, the image capturing apparatus 105 is disposed so that the horizontal direction of the transport vehicle 100 is always included in the high-resolution region 10a. Accordingly, even in the image 801 in which the cargo bed 102 is in the raised state, the vehicle 602 and the loaded object 603 can be included in one angle of view without adjusting the installation direction (optical axis direction) of the image capturing apparatus 105. However, the rear vehicle 602 is shifted upward in the high-resolution region 10a.

Figure 9:
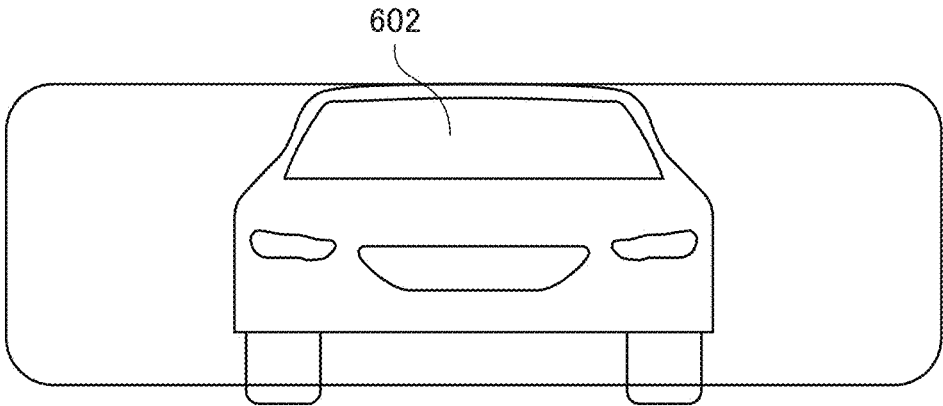
FIG. 9 is a diagram showing an example of an image cut out from an image 801 when the cargo bed 102 is in a raised state.

FIG. 9 is a diagram showing an example of an image cut out from the image 801 in a state where the cargo bed 102 is raised, and in this example, processing for cutting out the upper side in the high-resolution region 10a is performed according to the inclination angle 20a. Accordingly, the rear vehicle 602 and the like can be clearly shot at high resolution, and the cut-out image can be displayed on the image display unit 106 for the rear-view mirror.

Additionally, in this example, the loaded object 603 is present on the cargo bed 102, and is present in the lower portion of the angle of view of the low-resolution region 10b of the image capturing apparatus 105, the distance is close, and thus, the loaded object 603 can also be clearly imaged.

Thus, in the first embodiment, the image capturing apparatus 105 having a high resolution at the center of the angle of view is disposed on the upper portion of the front wall of the cargo bed 102 of the transport vehicle 100 and toward the rear of the transport vehicle 100, and the rear image is cut out according to the angle of the cargo bed, whereby monitoring for the backward direction can be performed at an appropriate angle of view. It is also possible to monitor the cargo bed.

Second Embodiment

Note that, as the second embodiment, a general wide-angle camera and fish-eye camera may be used in the image capturing apparatus 105. In this case, as explained in FIG. 4, a high-resolution image at the center of the angle of view cannot be obtained and compared to the imaging device 105 as explained in the present embodiment, the resolution at the center of the field of view is lower. However, it is still possible to recognize objects to some extent.

Third Embodiment

Figure 10:
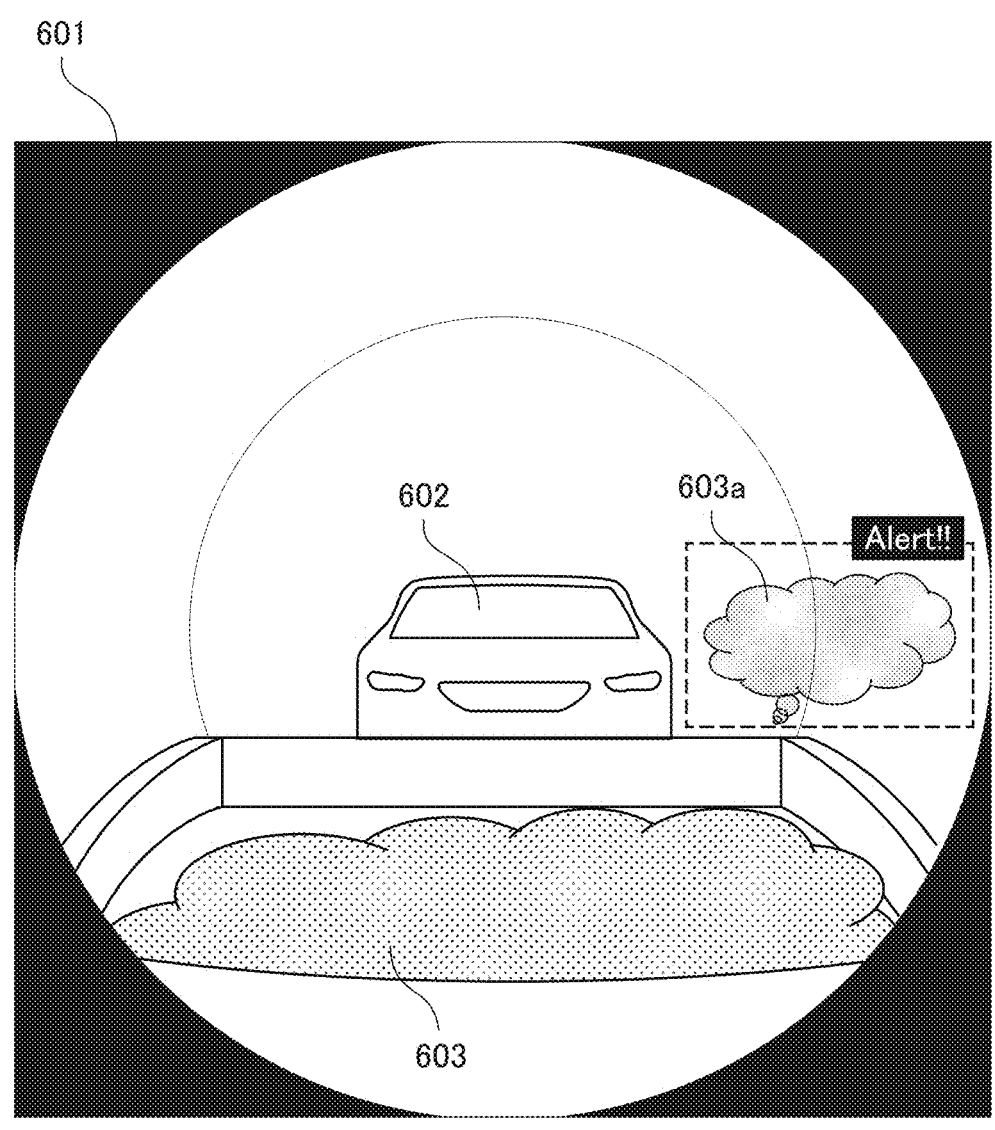
FIG. 10 is a diagram showing an example of a recognition result image displayed by the image display unit 106 in the third embodiment.

Next, in the third embodiment, an example of displaying an image and an image recognition result on the image display unit 106 will be explained. FIG. 10 is a diagram showing an example of the recognition result image displayed by the image display unit 106 in the third embodiment, and the display image as shown in FIG. 10 shows the rear of the transport vehicle 100, and an image of the loaded object 603 on the cargo bed 102 is included in a lower part of the screen.

These images are obtained by performing various kinds of development processing on an image captured by the image capturing apparatus 105 by the development processing unit 13, and further performing distortion correction on the image by the distortion correction unit 15. Furthermore, the object detection result performed by the object detection processing unit 16 is also superimposed on the image and displayed as a combined image.

Specifically, in a case where the object detection processing unit 16 detects a fall of a part of the loaded object, a fallen object detection frame 603a is displayed as a warning on the right side of the screen as shown in FIG. 10. Note that the warning includes displaying a predetermined character or frame on the image display unit 106. By displaying such a warning, an operator in the operator's cab can easily notice the fall of the loaded object.

Additionally, for example, even in a case where the transport vehicle 100 is automatically driven or remotely operated, the operator can notice the falling of the loaded object by displaying the image as shown in FIG. 10 on the terminal of the operator at a remote place. Therefore, in the transport vehicle 100, a decrease in safety due to an accident such as a fall of load object can be prevented.

Figure 11:
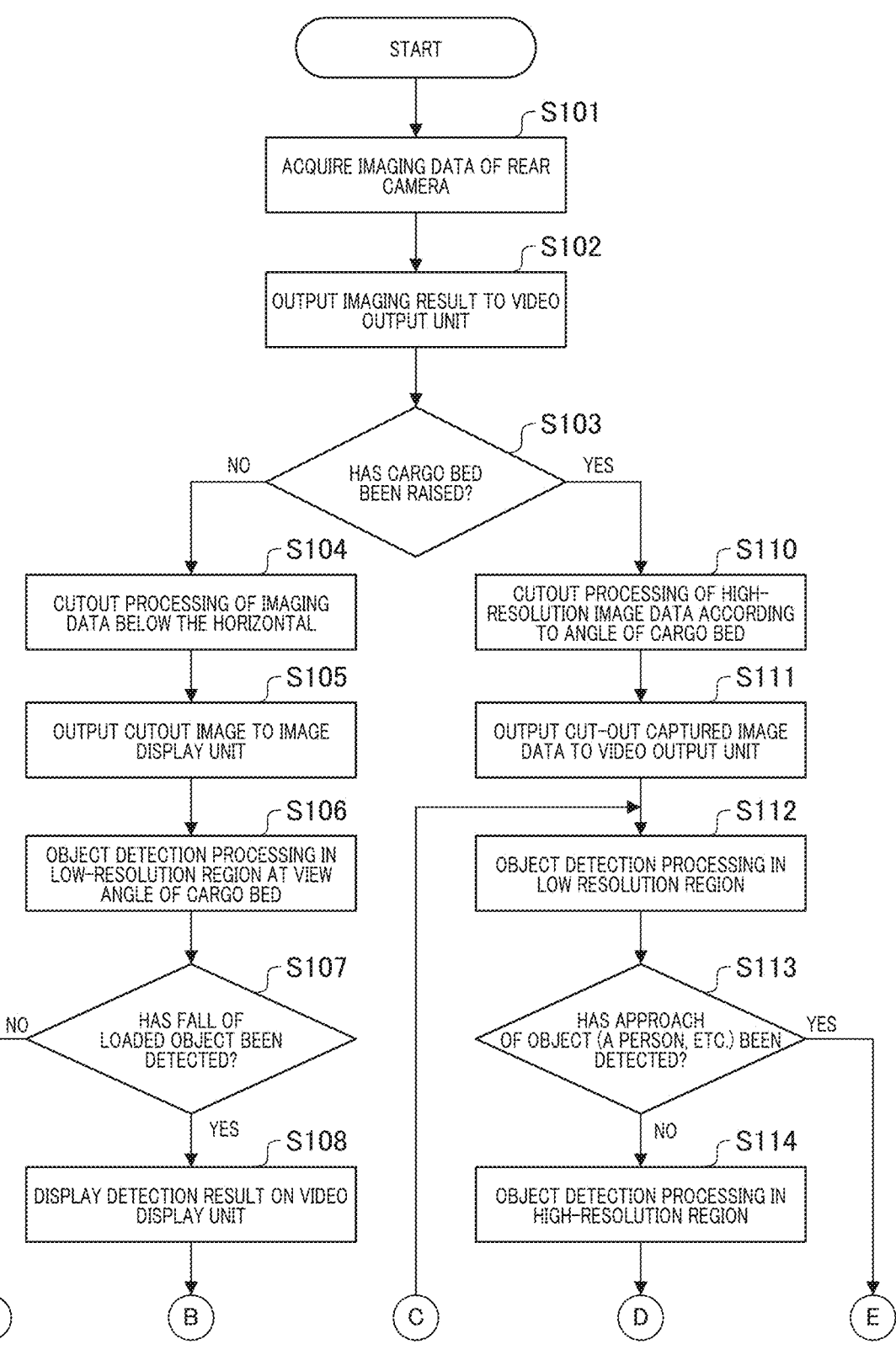
FIG. 11 is a flowchart illustrating an example of processing of an image capturing apparatus in the first embodiment.
Figure 12:
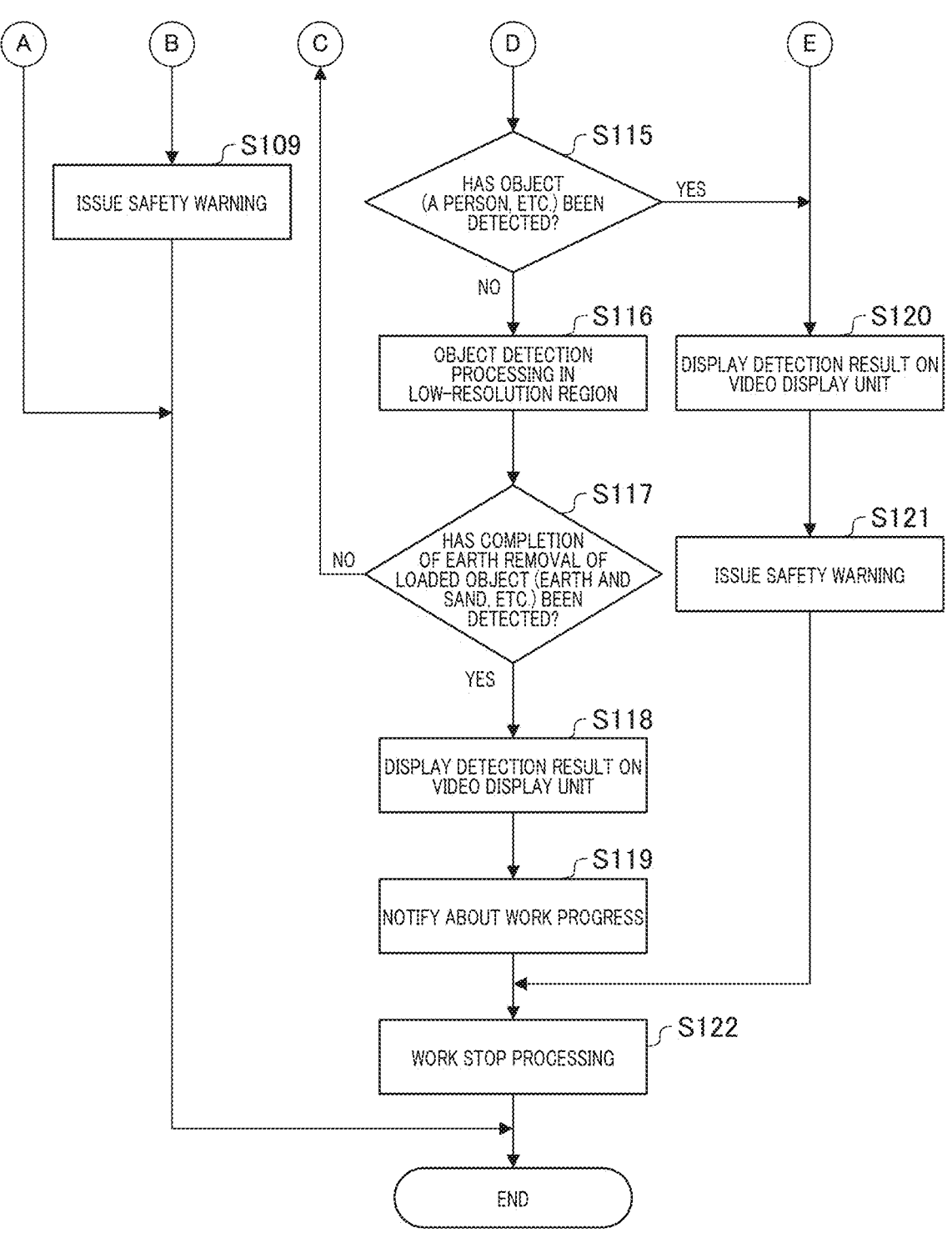
FIG. 12 is a continuation of the flow chart of FIG. 11.

FIG. 11 is a flowchart showing an example of the processing of the image capturing apparatus of the first embodiment, and FIG. 12 is a flowchart continued from FIG. 11. The processing of each step in FIG. 11 and FIG. 12 is performed by a CPU (not illustrated) in the control unit 12 calling a program corresponding to the processing content from the ROM, expanding the program in the RAM, and executing this flowchart.

Additionally, while the power source of the transport vehicle 100 is on, or during traveling, the processes of the flowchart as shown in FIG. 11 and FIG. 12 are repeatedly executed, for example, periodically.

First, in step S101, the CPU of the control unit 12 acquires the imaging data by controlling the aperture (not illustrated) of the optical system 10 of the image capturing apparatus 105, which is the rear camera of the transport vehicle 100, and the accumulation time of the imaging unit 11. The imaging data includes the rear of the vehicle of the transport vehicle 100 and the cargo bed 102 as shown in FIG. 11 as described above.

Next, in step S102, the CPU of the control unit 12 controls the development processing unit 13, the distortion correction unit 15, and the display image generation unit 17 to generate a display image from the above-described imaging data and display the display image on the image display unit 106. As described above, this is display data in which the rear image of the transport vehicle 100 and the image of the cargo bed 102 are combined. Note that the display image is displayed as, for example, a moving image.

In step S103, the CPU of the control unit 12 determines whether or not the cargo bed 102 has been raised (inclined) based on the output of an angle detection sensor 104 by an inclination detection processing unit 14. If the determination result is "NO", the process proceeds to step S104, and if the determination result is "YES", the process proceeds to step S110.

Next, steps S104 to S109 and steps S110 to S122 are exclusively executed by the CPUs of the control unit 12, as shown in FIG. 11. First, steps S104 to S109 will be explained.

First, in step S104, the CPU of the control unit 12 controls the development processing unit 13, the distortion correction unit 15, and the display image generation unit 17 to execute the cutout processing on an image region of a lower portion than a horizontal angle of view with respect to image data captured by the image capturing apparatus 105. The image cut out here is, for example, a rectangular image having an angle of view corresponding to a rear-view mirror as shown in FIG. 7, and is an image of a high-resolution region.

Next, in step S105, the CPU of the control unit 12 outputs the cut-out image of the high-resolution region to the image display unit 106 to display the image. Next, in step S106, the CPU of the control unit 12 controls the object detection processing unit 16 to execute object detection processing (image recognition) on the entire image region below the horizon of the angle of view of the image data captured by the image capturing apparatus 105. Note that the image region to which the object detection processing is performed at this time also includes the image of the angle of view of the cargo bed reflected in the low-resolution region.

Note that the learning data applied when the object detection process is performed in step 106 may be limited to a predetermined load, and therby, the detection of only the load on the loading platform 102 may be executed.

Next, in step S107, the CPU of the control unit 12 determines whether or not the fall of an object (a loaded object and the like) and the like has been detected in step S106. If the fall and the like of the object (loaded object and the like) are not detected, the flowcharts of FIG. 11 and FIG. 12 end, and if the fall and the like of the object (loaded object and the like) are detected, the process proceeds to step S108.

Here, step S107 functions as a determination step (determination unit) providing a warning in a case where the fall of the object loaded on the cargo bed is detected.

Next, in step S108, the CPU of the control unit 12 superimposes the information on the detected load object on the display image displayed in step S105. Specifically, the detection position of the loaded object on the image is calculated based on the detection result performed by the object detection processing unit 16, and the loaded object detection frame is added to the image. Thus, the fallen object detection frame 603a is displayed as a warning on the right side of the screen, as shown in FIG. 10. As described above, the warning includes the display of a predetermined character or frame by the image display unit.

Next, in step S109, the CPU of the control unit 12 controls the determination processing unit 18 to issue a warning by using the warning unit 108. For example, in a case where a fall of the loaded object and the like are detected, a red warning lamp is turned on. Alternatively, a warning sound may be emitted. That is, the warning includes emission of a predetermined color or a predetermined sound.

Accordingly, it is possible to provide a notification of the detection of the fall of the loaded object and the like to the surroundings of the transport vehicle 100, in addition to the operator of the transport vehicle 100. After the process of step S109, the flows of FIG. 11 and FIG. 12 end. However, as described above, the flows of FIG. 11 and FIG. 12 are repeatedly executed, for example, periodically.

Next, steps S110 to S122 will be explained. If the determination result in step S103 is YES, in step S110, the CPU of the control unit 12 controls the development processing unit 13, the distortion correction unit 15, and the display image generation unit 17 to perform processing of cutting out high-resolution imaging data according to the inclination angle of the cargo bed 102.

That is, in step S110, the CPU of the control unit 12 cuts out a part of the high-resolution region 10a from the image data captured by the image capturing apparatus 105 based on the inclination angle of the cargo bed 102 that has been detected by the inclination detection processing unit 14 in step S103.

Specifically, as the inclination angle of the cargo bed 102 increases, the image of the rear vehicle 602 and the like shifts to the upper side of the screen as shown in FIG. 8, and thus, the image of the upper side of the high-resolution region 10a is cut out.

Next, in step S111, the CPU of the control unit 12 outputs the cutout image to the image display unit. Therefore, even if the cargo bed 102 is inclined, the image cut out from the image region shifted to the upper side (the image region corresponding to the rear vehicle and the like) can be displayed on the image display unit 106 for the rear-view mirror.

Next, in step S112, the CPU of the control unit 12 controls the object detection processing unit 16 to execute object detection processing on the image data including the low-resolution region captured by the image capturing apparatus 105. At this time, detection of only an approaching object (a person and the like) is executed by limiting the learning data applied to the object detection processing to a predetermined object, for example, a person and a predetermined object.

Next, in step S113, the CPU of the control unit 12 determines that the approach of the object (a person and the like) has been detected in step S112. If the approach of the object (a person and the like) is not detected, the process proceeds to step S114, and if the approach of the object (a person and the like) is detected, the process proceeds to step S120. Here, the step S113 functions as a determination step (determination unit) of providing a warning in a case where a predetermined object approaches the cargo bed while the cargo bed is inclined.

In step S114, the CPU of the control unit 12 controls the object detection processing unit 16 to execute object detection processing on a high-resolution region of the image data captured by the image capturing apparatus 105. At this time, detection of only an approaching object (a person and the like) is executed by limiting the learning data applied to the object detection processing to an object, for example, a person and an object.

Next, in step S115, the CPU of the control unit 12 determines whether or not the approach of an object (a person and the like) has been detected in step S114. If the approach of the object (a person and the like) is not detected, the process proceeds to step S116, and if the approach of the object (a person and the like) is detected, the process proceeds to step S120. Here, step S115 functions as a determination step (determination unit) of providing a warning in a case where a predetermined object approaches the cargo bed while the cargo bed is inclined.

Next, in step S116, the CPU of the control unit 12 controls the object detection processing unit 16 to execute object detection processing on a low-resolution region of the image data captured by the image capturing apparatus 105. At this time, the detection of only the loaded object (earth and sand and the like) to be removed from the cargo bed 102 is executed by limiting the learning data applied to the object detection processing to a predetermined object including earth and sand.

Next, in step S117, the CPU of the control unit 12 determines whether or not the completion of the removal of the loaded object (earth and sand and the like) has been detected in step S116. In a case where the completion of the earth removal is detected, that is, in a case where a loaded object (earth and sand or the like) remaining on the cargo bed 102 is not detected, the process proceeds to step S118.

In a case where the completion of the earth removal is not detected in step S117, that is, in a case where the loaded object (earth and sand and the like) that is to be removed remaining on the cargo bed 102 is detected, the process returns to step S112, and the processes from step S112 to step S117 are repeated. That is, the processing is repeatedly executed until the completion of the earth removal is detected in step S117, that is, until no loaded object (earth and sand and the like) remaining on the cargo bed 102 is detected.

In step S118, the CPU of the control unit 12 superimposes information on the loaded object (earth and sand, and the like) to be removed on the image on the image display unit 106. Specifically, the information is displayed in a manner that a sentence, a mark, and the like indicating that the earth removal is completed, that is, the loaded object (earth and sand and the like) to be removed is no longer present on the cargo bed 102, is superimposed on the image displayed on the image display unit 106.

Next, in step S119, the CPU of the control unit 12 controls the determination processing unit 18 to issue (notify) a warning regarding the progress of the work by using the warning unit 108. For example, notification about the completion of the earth removal, that is, the absence of the loaded object (earth and sand, and the like) to be removed is provided by blinking a red warning lamp. As a result, it is possible to provide a notification that there is no loaded object (earth and sand and the like) to be removed to the surroundings of the transport vehicle 100, in addition to the operator of the transport vehicle 100.

In step S120, the CPU of the control unit 12 superimposes information on an object (a person and the like) on the display image. Specifically, the detection position of the object (a person and the like) on the image is calculated based on the detection result performed by the object detection processing unit 16, and an object (a person and the like) detection frame is added to an image. Thus, for example, a blinking red detection frame is superimposed on an image displayed on the image display unit 106 in a case where an object (a person and the like) approaches.

Next, in step S121, the CPU of the control unit 12 controls the determination processing unit 18 to issue a warning regarding safety by using the warning unit 108. For example, in a case where the approach of an object (a person and the like) is detected, a red warning light is turned on. Accordingly, it is possible to provide a notification of the approach of the object (a person and the like) to the surroundings of the transport vehicle 100 in addition to the operator of the transport vehicle 100.

Next, in step S122, the CPU of the control unit 12 controls the determination processing unit 18 to transmit a stopping signal to the hydraulic pumps 103, and to stop the raising of the cargo bed 102. Note that the lowering of the cargo bed 102 may be started along with this.

Thus, according to the present embodiment, even if the operator does not notice an object (a person and the like) approaching the cargo bed 102 when the operator of the transport vehicle 100 is performing work such as earth removal, a warning of the approach of the object (a person and the like) can be displayed on the screen or a warning can be issued by using a warning light.

Additionally, according to the above-described embodiments, the operator of the transport vehicle 100 can perform both the monitoring for the backward direction and the monitoring for the cargo bed based on the content displayed on the image display unit 106 and the detection result performed by the object detection processing unit 16 by using only one image capturing apparatus.

Although, in the above-described embodiments, a difference in resolution such as the low-resolution region 10*b* and the high-resolution region 10*a* is generated in the image output from the image capturing apparatus due to the optical characteristics of the optical system 10 of the image capturing apparatus 105, the present invention is not limited thereto.

For example, the difference in resolution may be caused by the pixel density of the imaging unit 11 of the image capturing apparatus 105. Specifically, the resolution of the peripheral portion of the angle of view may be set to be relatively lower than that of the central portion of the angle of view by setting the pixel density of the sensor to be sparse toward the peripheral portion of the angle of view.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image capturing system and the like through a network or various storage media. Then, a computer (or a CPU, an MPU, or the like) of the image capturing system and the like may be configured to read and execute the program. In such a case, the program and the storage medium storing the program configure the present invention.

In addition, the present invention includes those realized by using at least one processor or circuit configured to perform functions of the embodiments explained above. For example, a plurality of processors may be used for distribution processing to perform functions of the embodiments explained above.

This application claims the benefit of priority from Japanese Patent Application No. 2023-164709, filed on Sep. 27, 2023, which is hereby incorporated by reference herein in its entirety.

What is claimed is:

1. An image capturing system comprising:
an image capturing apparatus disposed in a vehicle provided with a cargo area; and
at least one processor or circuit configured to function as:
a display image generation unit configured to output image data generated by the image capturing apparatus to an image display unit,
wherein the image capturing apparatus is disposed in such a manner that a first region in the rear of the vehicle and a second region including the cargo area can be imaged simultaneously,
wherein the image capturing apparatus generates the image data by imaging the first region at a higher resolution than the second region.

2. The image capturing system according to claim 1, wherein the image capturing apparatus has an imaging element and an optical system that forms an optical image on a light receiving surface of the imaging element,
wherein the optical system forms an optical image having a first resolution in a central region including a center of the light receiving surface of the imaging element, and forms an optical image having a second resolution lower than the first resolution in a peripheral region around the central region, and
wherein the optical system forms an optical image of the first region in the central region and forms an optical image of the second region in the peripheral region.

3. An image capturing system comprising:
an image capturing apparatus disposed in a vehicle provided with a cargo area; and
at least one processor or circuit configured to function as:
a display image generation unit configured to output image data generated by the image capturing apparatus to an image display unit,
wherein the image capturing apparatus is disposed in such a manner that a first region in the rear of the vehicle and a second region including the cargo area can be imaged simultaneously, wherein at least one processor or circuit is further configured to function as a determination unit configured to provide a warning in a case where a fall of an object loaded on the cargo area is detected or in a case where a predetermined object approaches the cargo area during inclination of the cargo area.

4. The image capturing system according to claim 3, wherein the warning includes emission of a predetermined color or a predetermined sound.

5. The image capturing system according to claim 3, wherein the warning includes display of a predetermined character or frame by the image display unit.

\* \* \* \* \*